US012325124B2

(12) United States Patent
Touma et al.

(10) Patent No.: US 12,325,124 B2
(45) Date of Patent: Jun. 10, 2025

(54) COLLABORATIVE-ROBOT RISK ASSESSMENT GUIDANCE DEVICE AND METHOD

(71) Applicant: FANUC CORPORATION, Yamanashi (JP)

(72) Inventors: Naoki Touma, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 193 days.

(21) Appl. No.: 18/009,459

(22) PCT Filed: Jul. 5, 2021

(86) PCT No.: PCT/JP2021/025231
§ 371 (c)(1),
(2) Date: Dec. 9, 2022

(87) PCT Pub. No.: WO2022/009814
PCT Pub. Date: Jan. 13, 2022

(65) Prior Publication Data
US 2023/0234247 A1 Jul. 27, 2023

(30) Foreign Application Priority Data
Jul. 7, 2020 (JP) .................. 2020-117192

(51) Int. Cl.
*B25J 19/06* (2006.01)
*B25J 9/16* (2006.01)
(52) U.S. Cl.
CPC ............. *B25J 19/06* (2013.01); *B25J 9/1676* (2013.01)
(58) Field of Classification Search
CPC ................. B25J 19/06; B25J 9/1676
See application file for complete search history.

(56) References Cited

U.S. PATENT DOCUMENTS

2006/0038688 A1 2/2006 Nakamura
2007/0194097 A1 8/2007 Jones et al.
(Continued)

FOREIGN PATENT DOCUMENTS

CN 101376249 A 3/2009
JP 2003-263212 A 9/2003
(Continued)

OTHER PUBLICATIONS

British Standard BS EN ISO 121002010 (No particular authors cited—Developed and written by Committee, dated 2011) (Year: 2011).*

(Continued)

*Primary Examiner* — Adam R Mott
*Assistant Examiner* — Matthew C Gammon
(74) *Attorney, Agent, or Firm* — Maier & Maier, PLLC

(57) ABSTRACT

A collaborative-robot risk assessment guidance device, including: an input device that receives inputs; a storage device; a display device; and at least one processing device, where the processing device prompts a user to input basic information including conditions for collaborating with people, prompts the user to select at least one candidate information item for hazard sources stored in the storage device in association with the input basic information, performs a risk assessment on a basis of risk specifics information stored in the storage device in association with the selected candidate information item for the hazard sources, determines whether a result of the risk assessment is at or below an acceptable risk, and displays, on the display device, countermeasure proposals for separating people and a collaborative robot without partitioning a space therebetween in a case in which the result of the risk assessment is not at or below the acceptable risk.

3 Claims, 12 Drawing Sheets

(56) References Cited

U.S. PATENT DOCUMENTS

| | | | |
|---|---|---|---|
| 2008/0256131 A1* | 10/2008 | Shimohara | ............. G06Q 10/06 |
| 2010/0191372 A1 | 7/2010 | Nihei et al. | |
| 2016/0229068 A1 | 8/2016 | Haman et al. | |

FOREIGN PATENT DOCUMENTS

| | | | |
|---|---|---|---|
| JP | 2005-085178 A | | 3/2005 |
| JP | 2005-122525 A | | 5/2005 |
| JP | 2008-262490 A | | 10/2008 |
| JP | 2009-176058 A | | 8/2009 |
| JP | 2010-188515 A | | 9/2010 |
| JP | 2013-082071 A | | 5/2013 |
| JP | 2014-188644 A | | 10/2014 |
| JP | 2016-062237 A | | 4/2016 |
| JP | 2018147179 A | * | 9/2018 |
| JP | 2020-082307 A | | 6/2020 |
| WO | 2003/075107 A1 | | 9/2003 |
| WO | 2007/101129 A2 | | 9/2007 |

OTHER PUBLICATIONS

International Search Report and Written Opinion issued on Sep. 14, 2021, in corresponding International Application No. PCT/JP2021/025231, 7 pages.

\* cited by examiner

FIG. 3

HAZARD SOURCE LIST

| TYPE | HAZARD SOURCES EXAMPLES ||
|---|---|---|
| | CAUSE | RESULT |
| MECHANICAL HAZARD SOURCES | A : ACCELERATION, DECELERATION | a : BEING RUN OVER |
| | B : ANGULAR PORTION | b : BEING THROWN OUT |
| | C : APPROACH OF A MOVABLE ELEMENT TO A FIXED PORTION | c : CRUSHING |
| | ⋮ | ⋮ |
| ELECTRICAL HAZARD SOURCES | A : ARC | a : BURN |
| | B : ELECTROMAGNETIC PHENOMENON | b : CHEMICAL EFFECT |
| | C : ELECTROSTATIC PHENOMENON | c : EFFECT ON MEDICAL EQUIPMENT INSIDE BODY |
| | ⋮ | ⋮ |
| THERMAL HAZARD SOURCES | A : EXPLOSION | a : BURN |
| | B : FIRE | b : DEHYDRATION |
| | ⋮ | ⋮ |
| HAZARD SOURCES DUE TO NOISE | A : CAVITATION | a : MALAISE |
| | B : EXHAUST SYSTEM | b : LOSS OF COGNITION |
| | ⋮ | ⋮ |
| HAZARD SOURCES DUE TO VIBRATION | A : CAVITATION | a : MALAISE |
| | B : ADJUSTMENT ERROR OF MOVABLE PORTION | b : BACK INJURY |
| | ⋮ | ⋮ |
| HAZARD SOURCES DUE TO RADIATION | A : IONIZING RADIATION SOURCE | a : BURN |
| | B : LOW-FREQUENCY ELECTROMAGNETIC RADIATION | b : EYE AND SKIN INJURY |
| | ⋮ | ⋮ |
| HAZARD SOURCES DUE TO MATERIALS AND SUPPLIES | A : AEROSOL | a : DYSPNEA/SUFFOCATION |
| | B : BIOLOGICAL OR MICROBIOLOGICAL ACTIVE SUBSTANCE | b : CANCER |
| | | c : CORROSION |
| | ⋮ | ⋮ |
| HAZARD SOURCES DUE TO NEGLECTING ERGONOMIC PRINCIPLES | A : APPROACH | a : MALAISE |
| | B : DESIGN OR POSITION OF INDICATOR AND VISUAL DISPLAY UNIT | b : FATIGUE |
| | | c : MUSCULOSKELETAL INJURY |
| | ⋮ | ⋮ |
| HAZARD SOURCES RELATED TO ENVIRONMENT IN WHICH MACHINE IS USED | A : DUST AND FOG | a : BURN |
| | B : ELECTROMAGNETIC INTERFERENCE | b : MINOR ILLNESS |
| | ⋮ | ⋮ |
| HAZARD SOURCES COMBINATION | FOR EXAMPLE, REPETITIVE MOTION + EXERTION + HIGH-TEMPERATURE ENVIRONMENT | FOR EXAMPLE, DEHYDRATION SYMPTOMS AND MEMORY LOSS |

FIG. 4

| PERIPHERAL ENVIRONMENT | | |
|---|---|---|
| COLLABORATIVE ROBOT CONFIGURATION | 1. | COLLABORATIVE ROBOT INSTALLATION METHOD: ROBOT SECURING METHOD (FIXED TYPE OR MOVABLE, INSTALLATION SITE (FLOOR, SEALING, OR THE LIKE)) |
| | 2. | COLLABORATIVE ROBOT SPECIFICATIONS OR THE LIKE: MAXIMUM MOVING SPEED, LOAD CAPACITY, AND REACH |
| SURROUNDING ENVIRONMENT | 1. | AMBIENT ENVIRONMENT IN WHICH COLLABORATIVE ROBOT SYSTEM IS INSTALLED (WITH/WITHOUT AIR CONDITIONING EQUIPMENT, ETC.) |
| PERIPHERAL DEVICE | 1. | LAYOUT OR THE LIKE OF STEPS, MECHANICAL EQUIPMENT, ETC.: WITH/WITHOUT INDUSTRIAL TRAFFIC LINE AND EVASION SPACE |

FIG. 5

CONDITIONS FOR COLLABORATING WITH PEOPLE

| SPACE REQUIREMENT | 1. PERSON DOES NOT ENTER MOVABLE RANGE OF COLLABORATIVE ROBOT |
| --- | --- |
| | 2. PERSON ENTERS MOVABLE RANGE OF COLLABORATIVE ROBOT AND CONTACT WITH PERSON MAY OCCUR OVER THE ENTIRE REGION OF ROBOT MOVABLE PART (INCLUDING HAND AND WORKPIECE) |
| | 3. PERSON ENTERS MOVABLE RANGE OF COLLABORATIVE ROBOT AND CONTACT WITH PERSON MAY OCCUR IN A PORTION OF ROBOT MOVABLE PART (INCLUDING HAND AND WORKPIECE), AND CONTACT PART MAY CAUSE SERIOUS INJURY TO HUMAN BODY. |
| | 4. PERSON ENTERS MOVABLE RANGE OF COLLABORATIVE ROBOT AND CONTACT WITH PERSON MAY OCCUR IN A PORTION OF ROBOT MOVABLE PART (INCLUDING HAND AND WORKPIECE), AND CONTACT PART MAY CAUSE ACCIDENT RESULTING IN NO LOST WORK TIME WITH RESPECT TO HUMAN BODY. |
| | 5. PERSON ENTERS MOVABLE RANGE OF COLLABORATIVE ROBOT AND CONTACT WITH PERSON MAY OCCUR IN A PORTION OF ROBOT MOVABLE PART (INCLUDING HAND AND WORKPIECE), AND CONTACT PART MAY CAUSE MINOR ACCIDENT WITH RESPECT TO HUMAN BODY. |
| | 6. ALTHOUGH PERSON ENTERS MOVABLE RANGE OF COLLABORATIVE ROBOT AND CONTACT WITH PERSON MAY OCCUR IN A PORTION OF ROBOT MOVABLE PART (INCLUDING HAND AND WORKPIECE), CONTACT PART DOES NOT CAUSE HARM WITH RESPECT TO HUMAN BODY. |
| COLLABORATIVE ROBOT OPERATING SPEED SETTING | 1. EQUAL TO OR LESS THAN 100 mm/s |
| | 2. GREATER THAN 100 mm/s AND EQUAL TO OR LESS THAN 250 mm/s |
| | 3. GREATER THAN 250 mm/s AND EQUAL TO OR LESS THAN 500 mm/s |
| | 4. GREATER THAN 500 mm/s AND EQUAL TO OR LESS THAN 1000 mm/s |
| | 5. GREATER THAN 1000 mm/s |
| ROBOT HAND SETTING | 1. WITH/WITHOUT HAND GRIPPING FUNCTION (SELECTION OF MOTIVE POWER SOURCE) |
| | 2. MECHANICAL AND ELECTRICAL PROPERTIES OF HAND |
| | 3. MECHANICAL AND ELECTRICAL PROPERTIES AT HAND AND WORKPIECE |

FIG. 6

HAZARD SOURCES/HAZARDOUS EVENT LIST

| A | HAZARD SOURCES OF MACHINE COMPONENT/PROCESSING SUBJECT |
|---|---|
| 1 | SHAPE |
| 2 | RELATIVE POSITION |
| 3 | HELD POTENTIAL ENERGY |
| ⋮ | ⋮ |

| B | MACHINE INTERNAL STORED ENERGY |
|---|---|
| 1 | ELASTIC CONSTITUENT ELEMENT |
| 2 | PRESSURIZED LIQUID AND GAS |
| 3 | VACUUM EFFECT |

| C | MECHANICAL HAZARD SOURCES |
|---|---|
| 1 | CRUSHING HAZARD SOURCES |
| 2 | SHEARING HAZARD SOURCES |
| 3 | CUTTING/AMPUTATION HAZARD SOURCES |
| ⋮ | ⋮ |

| D | ELECTRICAL HAZARD SOURCES |
|---|---|
| 1 | CONTACT WITH CHARGING PORTION (DIRECT CONTACT) |
| 2 | CONTACT WITH CHARGING PORTION WHEN HAVING A PROBLEM (INDIRECT CONTACT) |
| 3 | APPROACH TO HIGH-VOLTAGE CHARGING PORTION |
| ⋮ | ⋮ |

| E | THERMAL HAZARD SOURCES |
|---|---|
| 1 | BURN, HEAT INJURY, ETC. DUE TO CONTACT WITH HIGH/LOW TEMPERATURE OBJECT, FIRE, EXPLOSION, AND RADIATION FROM HEAT SOURCE |
| 2 | HEALTH PROBLEM DUE TO HOT/COLD WORKING ENVIRONMENT |

| F | HAZARD SOURCES DUE TO NOISE |
|---|---|
| 1 | PHYSIOLOGICAL DISORDER SUCH AS HEARING IMPAIRMENT |
| 2 | INTERFERENCE WITH CONVERSATION, ACOUSTIC SIGNAL, ETC. |

| G | HAZARD SOURCES DUE TO VIBRATION |
|---|---|
| 1 | HANDHELD MACHINE THAT CAUSES NEURO/VASCULAR DISORDER |
| 2 | WHOLE-BODY VIBRATION IN POOR POSTURE |

| H | HAZARD SOURCES DUE TO RADIATION |
|---|---|
| 1 | LOW FREQUENCY/RADIO FREQUENCY RADIATION/MICROWAVES |
| 2 | INFRARED RAYS/VISIBLE LIGHT/ULTRAVIOLET RAYS |
| 3 | X-RAYS/Γ-RAYS |
| ⋮ | ⋮ |

| I | HAZARD SOURCES DUE TO MATERIALS/SUPPLIES |
|---|---|
| 1 | HAZARDOUS LIQUID/GAS/MIST/SMOKE/DUST |
| 2 | FIRE/EXPLOSION HAZARD SOURCES |
| 3 | BIOLOGICAL/MICROBIAL HAZARD SOURCES |

| J | HAZARD SOURCES DUE TO NEGLECTING ERGONOMIC PRINCIPLES |
|---|---|
| 1 | UNNATURAL POSTURE/OVEREXERTION |
| 2 | INAPPROPRIATE ANATOMICAL CONSIDERATION ABOUT LIMBS |
| 3 | NEGLECTING TO USE PROTECTIVE EQUIPMENT |
| ⋮ | ⋮ |

| K | UNEXPECTED START/EXCESS TRAVELING/OVERSPEED |
|---|---|
| 1 | CONTROL SYSTEM FAILURE/DISRUPTION |
| 2 | RECOVERY AFTER ENERGY SUPPLY INTERRUPTION |
| 3 | EXTERNAL EFFECT ON ELECTRICAL FACILITY |
| ⋮ | ⋮ |

| L | OTHER HAZARD SOURCES |
|---|---|
| 1 | HAZARD SOURCES COMBINATION |
| 2 | UNABLE TO STOP IN BEST STATE |
| 3 | FLUCTUATION IN TOOL ROTATIONAL SPEED |
| ⋮ | ⋮ |

| M | HAZARD SOURCES RELATED TO TRAVELING FUNCTION |
|---|---|
| 1 | MOVEMENT WHEN STARTING ENGINE |
| 2 | MOVEMENT WHILE OPERATOR IS ABSENT |
| 3 | MOVEMENT IN A STATE IN WHICH COMPONENT IS NOT IN SAFE POSITION |
| ⋮ | ⋮ |

FIG. 7

| | |
|---|---|
| N | HAZARD SOURCES DUE TO WORKING POSITION IN MOVING MACHINE |
| 1 | FALLING WHEN ENTERING/EXISTING AND BEING PRESENT AT MOVING POSITION |
| 2 | EXHAUST GAS/OXYGEN DEFICIENCY AT WORKING POSITION |
| 3 | FIRE (FLAMMABILITY CAB/LACK OF EXTINGUISHING MEANS) |
| ⋮ | ⋮ |

| | |
|---|---|
| O | MECHANICAL HAZARD SOURCES AT WORKING POSITION OF MOVING MACHINE |
| 1 | CONTACT WITH WHEEL/ROLLER |
| 2 | RUN OVER BY VEHICLE |
| 3 | FALLING/PENETRATING OBJECT |

| | |
|---|---|
| P | HAZARD SOURCES DUE TO MOVING MACHINE CONTROL SYSTEM |
| 1 | INAPPROPRIATE ARRANGEMENT OF MANUAL OPERATING DEVICE |
| 2 | INAPPROPRIATE DESIGN OF MANUAL OPERATING DEVICE/OPERATION MODE |

| | |
|---|---|
| Q | OTHER HAZARD SOURCES OF MOVING MACHINE |
| 1 | HAZARD SOURCES DUE TO HANDLING OF MOVING MACHINE |
| 2 | INAPPROPRIATE INSTRUCTION TO OPERATOR OF MOVING MACHINE |

| | |
|---|---|
| R | HAZARD SOURCES DUE TO MOTIVE POWER SOURCE/TRANSMISSION MECHANISM OF MOVING MACHINE |
| 1 | HAZARD SOURCES DUE TO ENGINE/BATTERY |
| 2 | HAZARD SOURCES DUE TO MOTIVE POWER TRANSMISSION BETWEEN MACHINES |
| 3 | HAZARD SOURCES DUE TO LINKING/PULLING OF MOVING MACHINE |

| | |
|---|---|
| S | HAZARD SOURCES OF MOVING MACHINE DUE TO THIRD PERSON |
| 1 | UNAUTHORIZED START/USE |
| 2 | DISLOCATION FROM STOP POSITION |

| | |
|---|---|
| T | MECHANICAL HAZARD SOURCES OF LIFTING MACHINE |
| 1 | APPROACH TO LOAD SUPPORT |
| 2 | DERAILMENT |
| 3 | INSUFFICIENT MECHANICAL STRENGTH |
| ⋮ | ⋮ |

| | |
|---|---|
| U | TIPPING OVER OF LIFTING MACHINE, LOAD DROP/COLLISION |
| 1 | LACK OF SAFETY |
| 2 | LOADING AND UNLOADING/OVERLOADING IN UNCONTROLLED STATE |
| 3 | AMPLITUDE OF MOTION IN UNCONTROLLED STATE |
| ⋮ | ⋮ |

| | |
|---|---|
| V | ELECTRICAL HAZARD SOURCES OF LIFTING MACHINE |
| 1 | LIGHTING |

| | |
|---|---|
| W | NEGLECTING ERGONOMIC PRINCIPLES IN LIFTING MACHINE |
| 1 | INSUFFICIENT VISIBILITY FROM OPERATING SEAT |

| | |
|---|---|
| X | MECHANICAL HAZARD SOURCES OF UNDERGROUND WORKING MACHINE |
| 1 | LACK OF STABILITY IN POWERED ROOF STANCHION |
| 2 | ACCELERATION/CONTROL FAILURE IN RAIL TRAVELING MACHINERY |
| 3 | EMERGENCY CONTROL FAILURE IN RAIL TRAVELING MACHINERY |

| | |
|---|---|
| Y | OTHER HAZARD SOURCES OF UNDERGROUND WORKING MACHINE |
| 1 | RESTRICTED HUMAN MOVEMENT |
| 2 | FIRE AND EXPLOSION |
| 3 | RELEASE OF DUST, GAS, ETC. |

| | |
|---|---|
| Z | MECHANICAL HAZARD SOURCES OF HOISTING/MOVING MACHINE |
| 1 | INAPPROPRIATE MECHANICAL STRENGTH/OPERATION FACTOR |
| 2 | LOAD CONTROL FAILURE |
| 3 | FAILURE IN CONTROL DEVICE OF PEOPLE CARRIER |
| ⋮ | ⋮ |

| | |
|---|---|
| AA | OTHER HAZARD SOURCES OF HOISTING/MOVING MACHINE |
| 1 | FALLING FROM PEOPLE CARRIER |
| 2 | FALLING/OVERTURNING OF PEOPLE CARRIER |
| 3 | HUMAN ERROR/HUMAN BEHAVIOR |

FIG. 12

| QUESTIONS | |
|---|---|
| 1 | IS THERE ANY RISK OF HEAD, NECK, OR LOWER EXTREMITIES OF WORKER BEING IN MOVABLE RANGE OF COLLABORATIVE ROBOT? |
| 2 | IS THERE ANY RISK OF BECOMING CAUGHT/ENTANGLED IN MACHINE? |
| 3 | IS THERE ANY RISK OF ELECTROCUTION? |
| 4 | IS THERE ANY HEAT SOURCE/HAZARDOUS MATERIAL THAT COULD BE CAUSE OF BURN, FIRE, OR EXPLOSION? |
| 5 | IS THERE ANY RISK OF CAUSING NOISE STRESS? |
| 6 | IS THERE ANY RISK OF CREATING HAZARDOUS STATE CAUSED BY VIBRATIONS? |
| 7 | IS THERE ANY RADIATION SOURCE THAT COULD INJURE PEOPLE? |
| 8 | IS MATERIAL/SUBSTANCE HANDLED BY MACHINE HAZARDOUS? |
| 9 | IS MACHINE EASY FOR OPERATOR TO HANDLE? |
| 10 | IS THERE ANY RISK OF SERIOUS ACCIDENT OCCURRING DUE TO COMBINATION OF MINOR HAZARD SOURCES? |
| 11 | IS THERE ANY RISK OF CONTROL SYSTEM PROBLEM CREATING HAZARDOUS STATE? |
| 12 | IS THERE ANY RISK OF BECOMING UNABLE TO STOP MACHINE? |
| 13 | IS THERE ANY RISK OF MOTIVE POWER SOURCE FAILURE CREATING HAZARDOUS STATE? |
| 14 | IS THERE ANY RISK OF ELECTRICAL CIRCUIT FAILURE CREATING HAZARDOUS STATE? |
| 15 | IS THERE ANY RISK OF ERRONEOUS COMPONENT HANDLING CREATING HAZARDOUS STATE? |
| 16 | IS THERE ANY RISK OF COMPONENT BREAKAGE DURING MACHINE OPERATION CREATING HAZARDOUS STATE? |
| 17 | IS THERE ANY RISK OF MACHINE RELEASING HAZARDOUS MATERIAL? |
| 18 | IS THERE ANY RISK OF MACHINE LOSING STABILITY? |
| 19 | IS THERE ANY RISK OF PEOPLE TRIPPING, SLIPPING, OR FALLING? |

COLLABORATIVE-ROBOT RISK ASSESSMENT GUIDANCE DEVICE AND METHOD

TECHNICAL FIELD

The present disclosure relates to a collaborative-robot risk assessment guidance device and method.

BACKGROUND ART

It is known that introducing a robot requires a risk assessment (for example, see Japanese Unexamined Patent Application, Publication No. 2014-188644).

SUMMARY

An aspect of the preset disclosure is a collaborative-robot risk assessment guidance device including: an input device that receives inputs from a user; a storage device that stores information; a display device that displays the information; and at least one processing device, wherein the processing device prompts the user to input, by means of the input device, basic information including conditions for collaborating with people, prompts the user to select, by means of the input device, at least one candidate information item for hazard sources stored in the storage device in association with the input basic information, performs a risk assessment on a basis of risk specifics information stored in the storage device in association with the selected candidate information item for the hazard sources, determines whether a result of the risk assessment is at or below an acceptable risk, and displays, on the display device, countermeasure proposals for separating people and a collaborative robot without partitioning a space therebetween in a case in which the result of the risk assessment is not at or below the acceptable risk.

BRIEF DESCRIPTION OF THE DRAWINGS

FIG. 3 is a diagram showing details of a hazard source list stored in the storage device in FIG. 2.

FIG. 4 is a diagram showing details of a peripheral environment, stored in the storage device in FIG. 2.

FIG. 5 is a diagram showing details of conditions for collaborating with people, stored in the storage device in FIG. 2.

FIG. 6 is a diagram showing details of the hazard source list or a hazardous event list, stored in the storage device in FIG. 2.

FIG. 7 is a diagram showing the continuation of FIG. 6.

FIG. 12 is a diagram showing questions for narrowing down candidate information about the hazard sources stored in the storage device in FIG. 2.

DETAILED DESCRIPTION OF THE EMBODIMENT

A collaborative-robot risk assessment guidance device 1 according to an embodiment of the present disclosure and a method employing the same will be described below with reference to the drawings.

Figure 1:
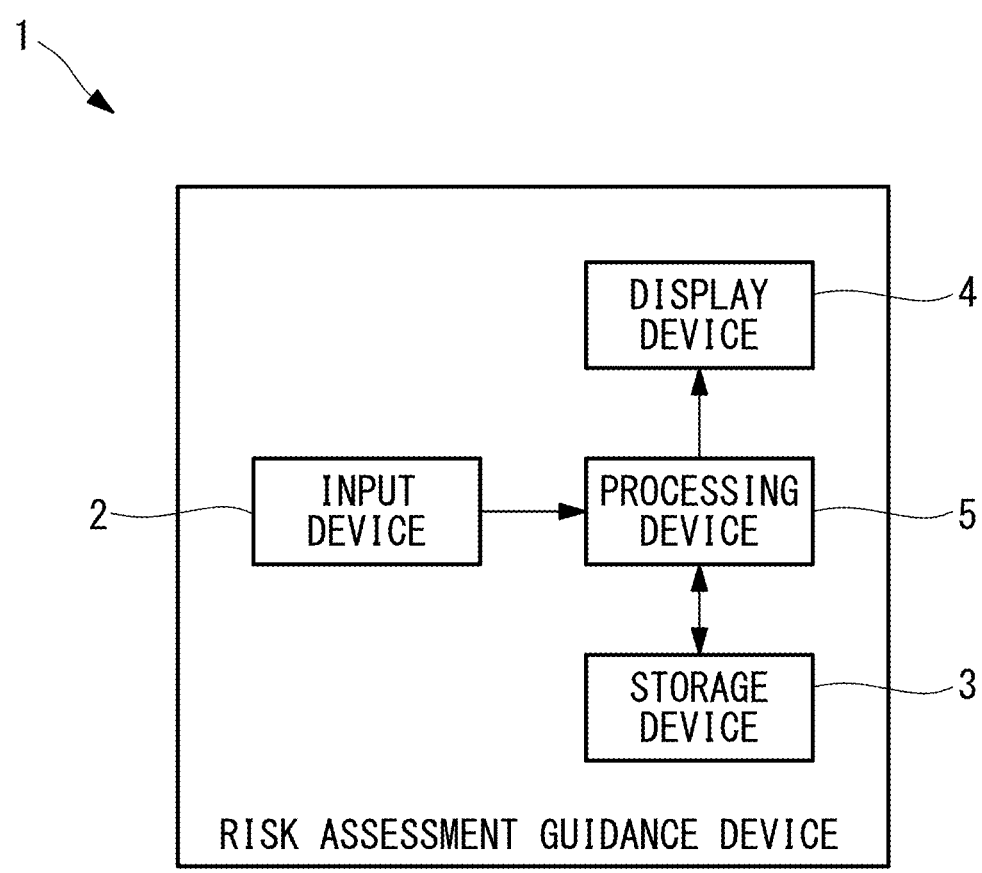
FIG. 1 is a block diagram showing a risk assessment guidance device according to an embodiment of the present disclosure.

As shown in FIG. 1, the risk assessment guidance device 1 according to this embodiment includes: an input device 2 that receives inputs from a user; a storage device 3 that stores information; a display device 4 that displays the information; and at least one processing device 5.

The input device 2 is, for example, a keyboard, a mouse, or the like.

The storage device 3 is, for example, a memory. The display device is, for example, a monitor.

The processing device 5 is a processor such as a CPU.

Figure 2:
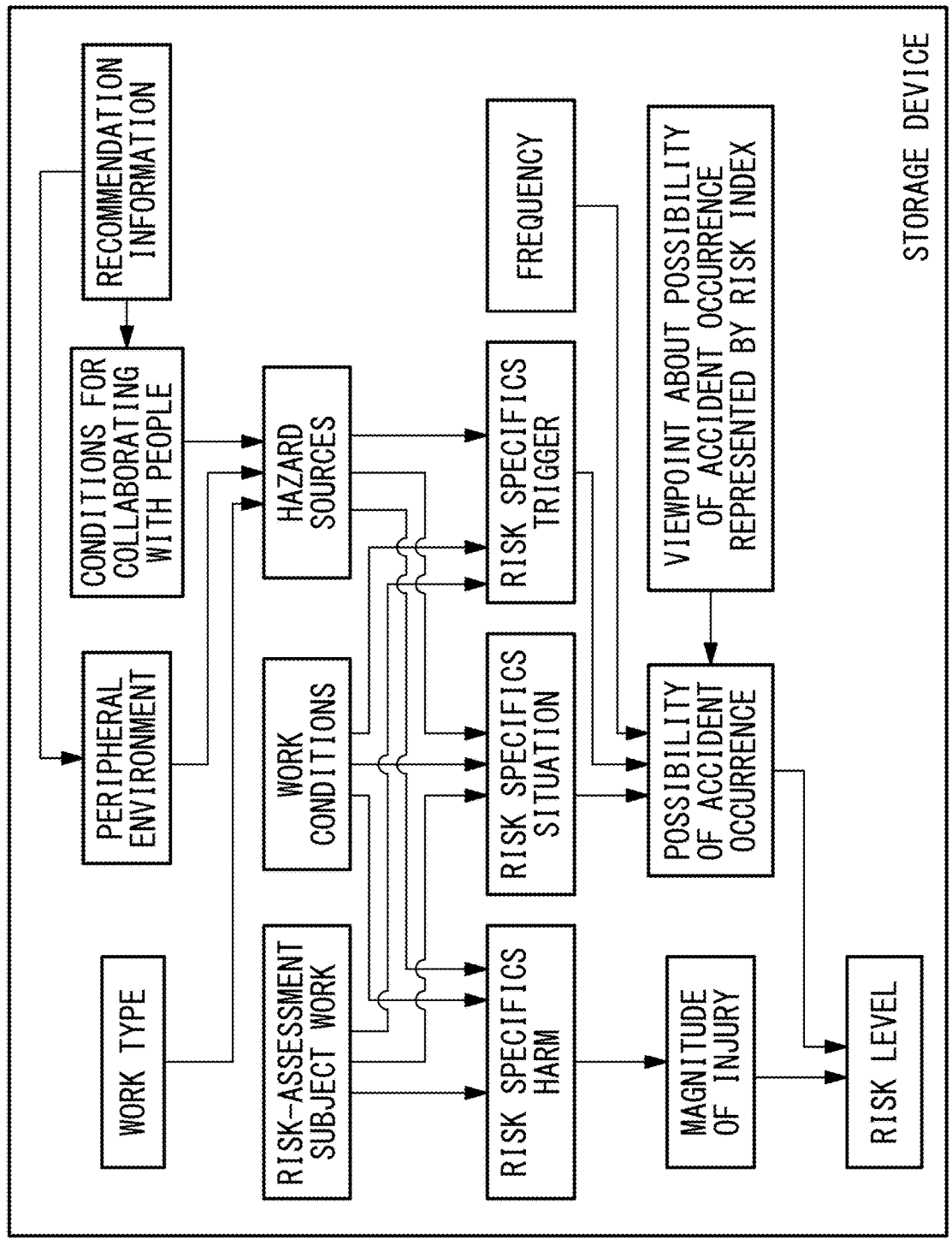
FIG. 2 is a diagram showing information stored in a storage device of the risk assessment guidance device in FIG. 1.

As shown in FIG. 2, the storage device 3 stores basic information items corresponding to three categories, namely, "work type", "peripheral environment", and "conditions for collaborating with people", and candidates of "hazard sources" associated with the categories of the basic information. Furthermore, as shown in FIG. 2, the storage device 3 stores "risk-assessment subject work", "work conditions", "risk specifics", "magnitude of injury", "possibility of accident occurrence", "risk level", "frequency", "viewpoint about possibility of accident occurrence represented by risk index", "recommendation information", "risk assessment practitioner", "risk assessment approver" and "residual risk".

As the "hazard source list", for example, the information items shown in FIG. 3 are stored.

As the "peripheral environment", for example, the information items shown in FIG. 4 are stored.

As the "conditions for collaborating with people", for example, the information items shown in FIG. 5 are stored.

As candidates of "hazard sources" or a candidate of a "hazardous event list", for example, the information items shown in FIGS. 6 and 7 are stored.

The respective information items included in the "work type", the "peripheral environment", and the "conditions for collaborating with people" are associated with one of the "hazard sources".

As the "risk-assessment subject work", "steady work", "non-steady work", "provisional work", and "abnormal work" are stored.

As the "work conditions", "facility or the like in operation during work", and "user's wearing state of specified protective equipment or the like" are stored. For the "facility or the like in operation during work", "in operation", "not in operation", "emergency stop", "abnormal stop", and so forth are stored for each facility. For the "user's wearing state of specified protective equipment or the like", protective equipment specified in an operation standards table or the like, such as helmet, gloves, leather gloves, safety shoes, and protective goggles, is stored.

As the "frequency", options about frequencies at which work is performed are stored.

As the "viewpoint about possibility of accident occurrence represented by risk index", options about "quarantine safety", "possibility of avoiding hazard sources", "attentiveness of people during work", and "frequency of accessing hazard sources" are stored.

As the "risk specifics", options about "harm", "situation", and "trigger" are stored. As the "harm", options about "site and degree of injury" are stored. As the "situation", options about "identity of person and specifics of engaged action" are stored. As the "trigger", options about "specifics of occurred phenomenon" are stored.

The "harm", the "situation", and the "trigger" in the "risk specifics" are respectively stored in association with the "hazard sources", the "risk-assessment subject work", the "work conditions", the "conditions for collaborating with people", the "work type", and the "peripheral environment".

As the "magnitude of injury", candidates of the magnitude of injury, namely, "serious injury (accident resulting in lost work time)", "minor injury (accident resulting in no lost work time)", "minor accident", and "no harm", for a risk assessment before implementing countermeasures are stored in association with the "harm" of the "risk specifics".

As the "possibility of accident occurrence", candidates of the possibility of accident occurrence, namely, "most certain", "highly likely", "likely", and "highly unlikely", for a risk assessment before implementing countermeasures are stored. The "possibility of accident occurrence" is stored in association with the "situation" and the "trigger" of the "risk specifics", the "frequency", and the "viewpoint about possibility of accident occurrence represented by risk index".

As the "risk level", candidates of the risk levels, namely, "unacceptable", "with major problem", "with problem", "acceptable", and "countermeasure not required", for a risk assessment before implementing countermeasures are stored in association with the "magnitude of injury" and the "possibility of accident occurrence".

As the "recommendation information", for example, a plurality of countermeasure proposal candidates, wherein a collaborative robot and people are separated without dividing a space therebetween, are stored.

For example, examples of the countermeasure proposal candidates include "separating a collaborative robot and a user with a worktable", "surrounding an area around a collaborative robot with color cones (registered trademark) and a chain to separate the collaborative robot from a user", and so forth. These countermeasure proposal candidates are for providing a prescribed distance between the collaborative robot and the user without dividing a space therebetween.

The recommendation information is created by incorporating, in the stored countermeasure proposal candidates, information about numerical values calculated in consideration of "layout of mechanical facility or the like" in the "peripheral device" of the "peripheral environment" and the "conditions for collaborating with people".

For example, in the case in which the countermeasure proposal candidate is "separating a collaborative robot and a user with a worktable", the position of the worktable, the height of the worktable, the width of the worktable, and so forth are calculated and incorporated.

In addition, depending on the "layout of mechanical facility or the like" and the "conditions for collaborating with people", in the case in which the head, the neck, or lower extremity of the user is in a movable range of the collaborative robot, values of at least one of the position, the height, and the width of the worktable are set high enough to avoid such a situation.

The processing device 5 performs a risk assessment by which a risk level is determined from various information items that have been input, and determines whether the risk level is at or below the acceptable risk. In the case in which it is determined that the risk level is at or below the acceptable risk, the processing device 5 records (stores) specifics of the risk assessment after a higher-ranking person confirms and approves the determination.

In the case in which it is determined that the risk level is not at or below the acceptable risk, the processing device 5 reconsiders the conditions, recommends countermeasures, and discloses residual risk information in a stepwise manner.

A risk assessment guidance method employing the thus-configured risk assessment guidance device 1 according to this embodiment will be described below.

Figure 8:
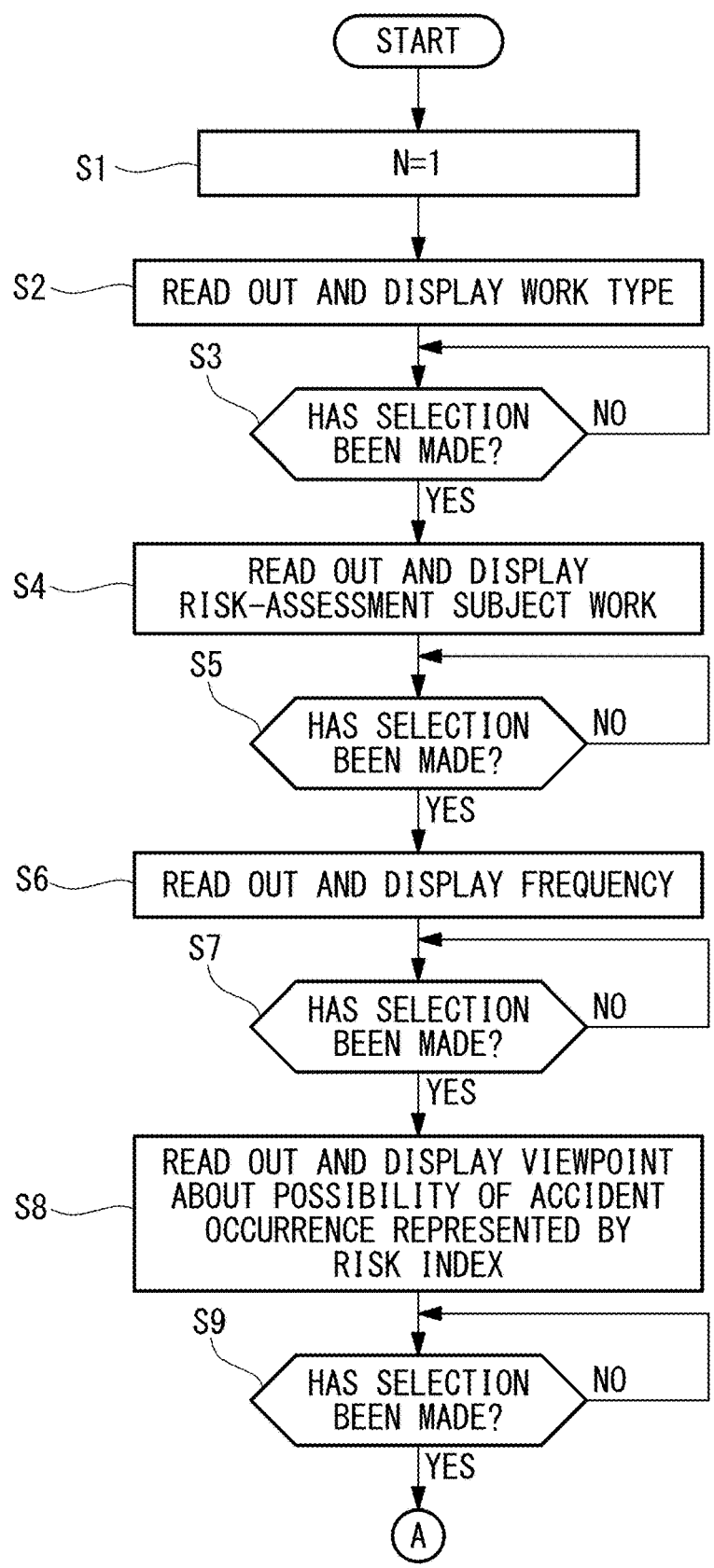
FIG. 8 is a flowchart showing a risk assessment guidance method according to an embodiment of the present disclosure.

Once a risk assessment is started, first, the user is prompted to input various information items to the processing device 5, as shown in FIG. 8.

Specifically, the processing device 5 resets a counter N (step S1), sequentially reads out candidates of the "work type" (basic information), the "risk-assessment subject work", the "frequency", and the "viewpoint about possibility of accident occurrence represented by risk index" from the storage device 3, and sequentially displays said candidates on the display device 4 (steps S2, S4, S6, and S8). Then, the user is prompted to select information items corresponding to the respective categories from the candidates displayed on the display device 4. The user selects the information items displayed on the display device 4 by using the input device 2 (steps S3, S5, S7, and S9).

Figure 9:
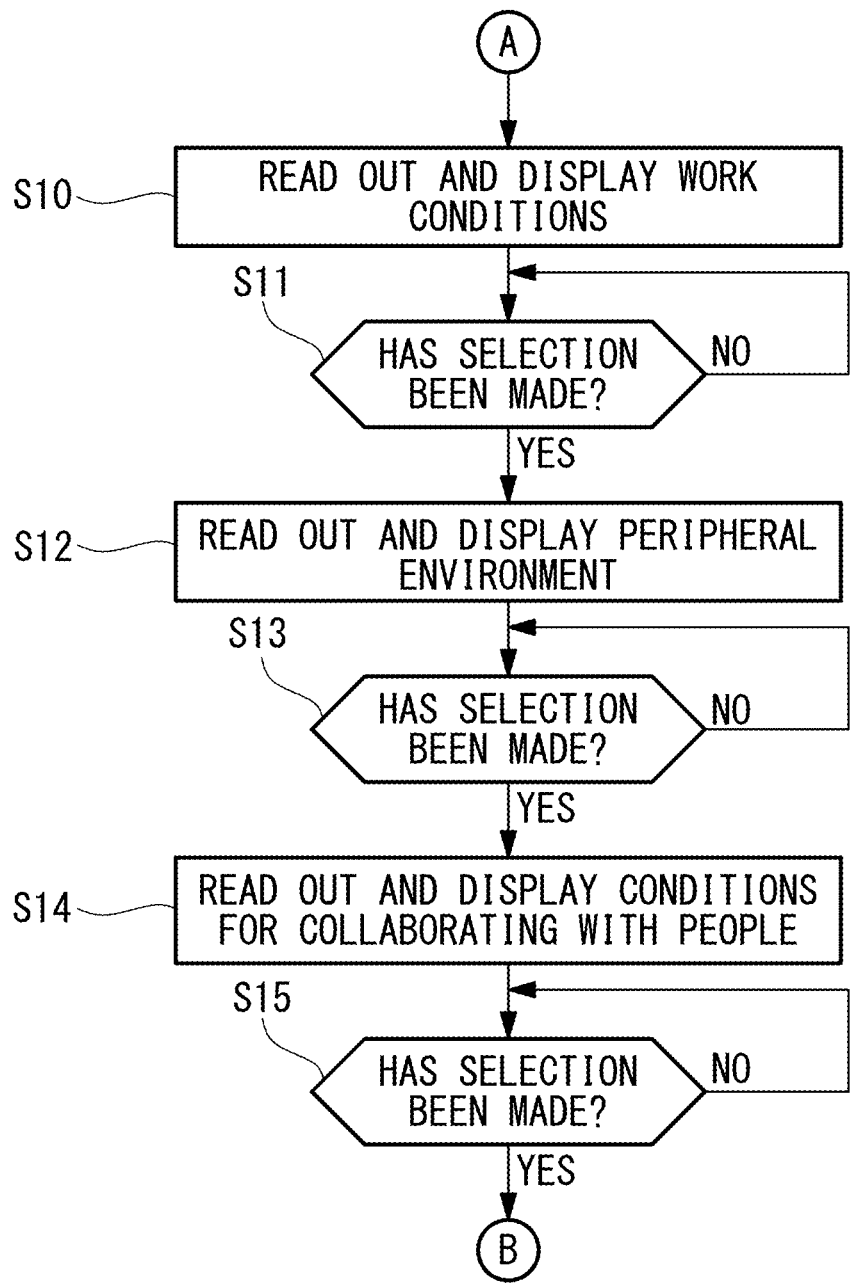
FIG. 9 is a flowchart showing the continuation from FIG. 8.

In addition, as shown in FIG. 9, the processing device 5 also sequentially reads out candidates of the information items corresponding to the "work conditions", the "peripheral environment" (basic information), and the "conditions for collaborating with people" (basic information) from the storage device 3 and displays said candidates on the display device 4 (steps S10, S12, and S14). Then, the user is prompted to select the information items corresponding to the respective categories from the candidates displayed on the display device 4. The user selects the information items displayed on the display device 4 by using the input device 2 (steps S11, S13, and S15).

Figure 10:
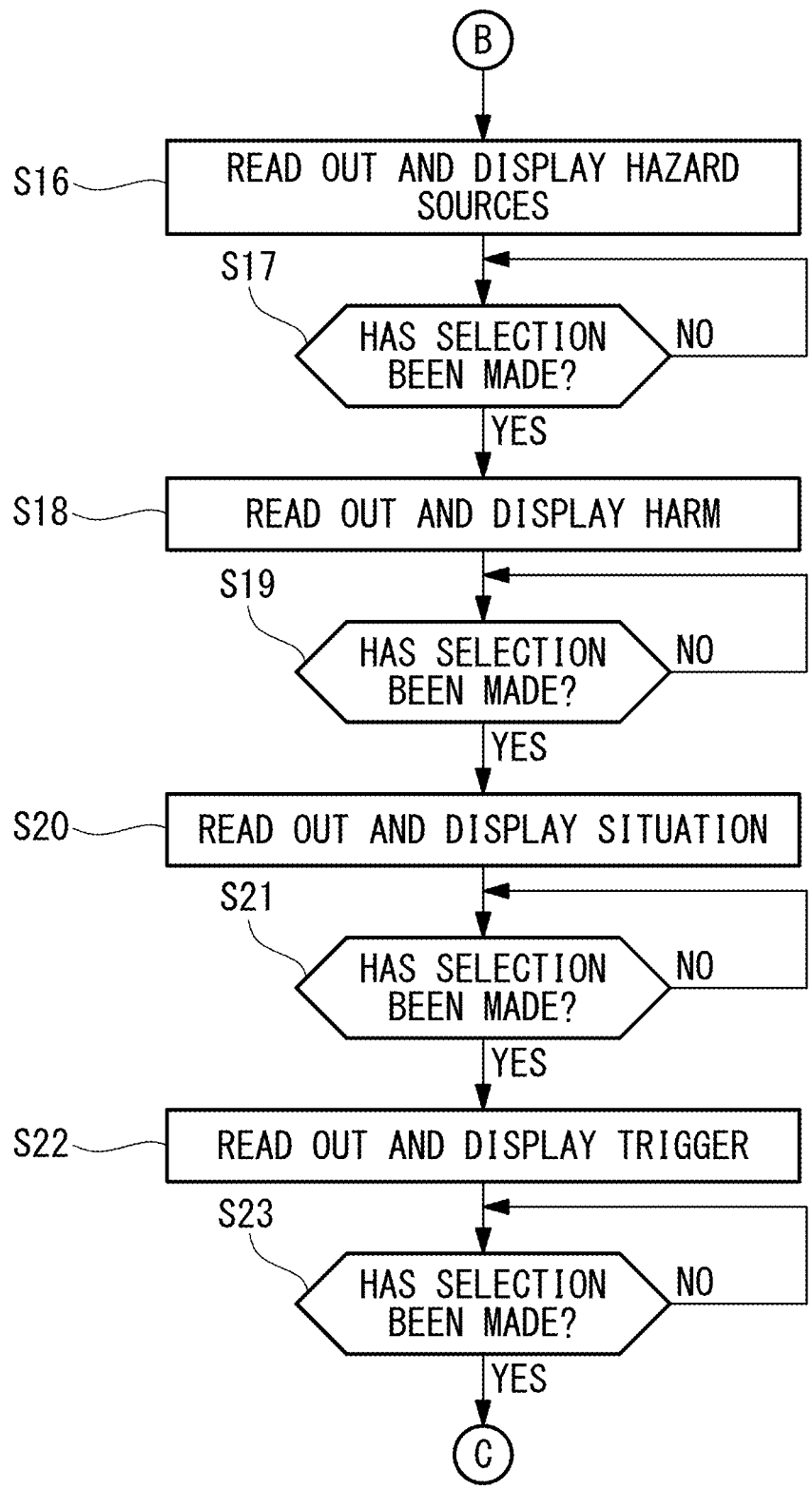
FIG. 10 is a flowchart showing the continuation from FIG. 9.

Next, as shown in FIG. 10, the processing device 5 reads out candidates of the "hazard sources" stored in association with the selected basic information from the storage device 3, displays said candidates on the display device 4 (step S16), and prompts the user to select at least one hazard source candidate. The user selects the information items displayed on the display device 4 by using the input device 2 (step S17).

Once the hazard sources are selected, the processing device 5 reads out candidates of the "risk specifics" stored in association with the selected hazard sources from the storage device 3 (steps S18, S20, and S22). In addition, the processing device 5 extracts just the candidates associated with the input "risk-assessment subject work", "work type", "peripheral environment", "conditions for collaborating with people", and "work conditions" from the read-out candidates of the "risk specifics".

Then, the processing device 5 displays the individual candidates of the "harm", the "situation", and the "trigger" of the extracted "risk specifics" on the display device, and prompts the user make a selection. The user selects the information items displayed on the display device 4 by using the input device 2 (steps S19, S21, and S23).

Figure 11:
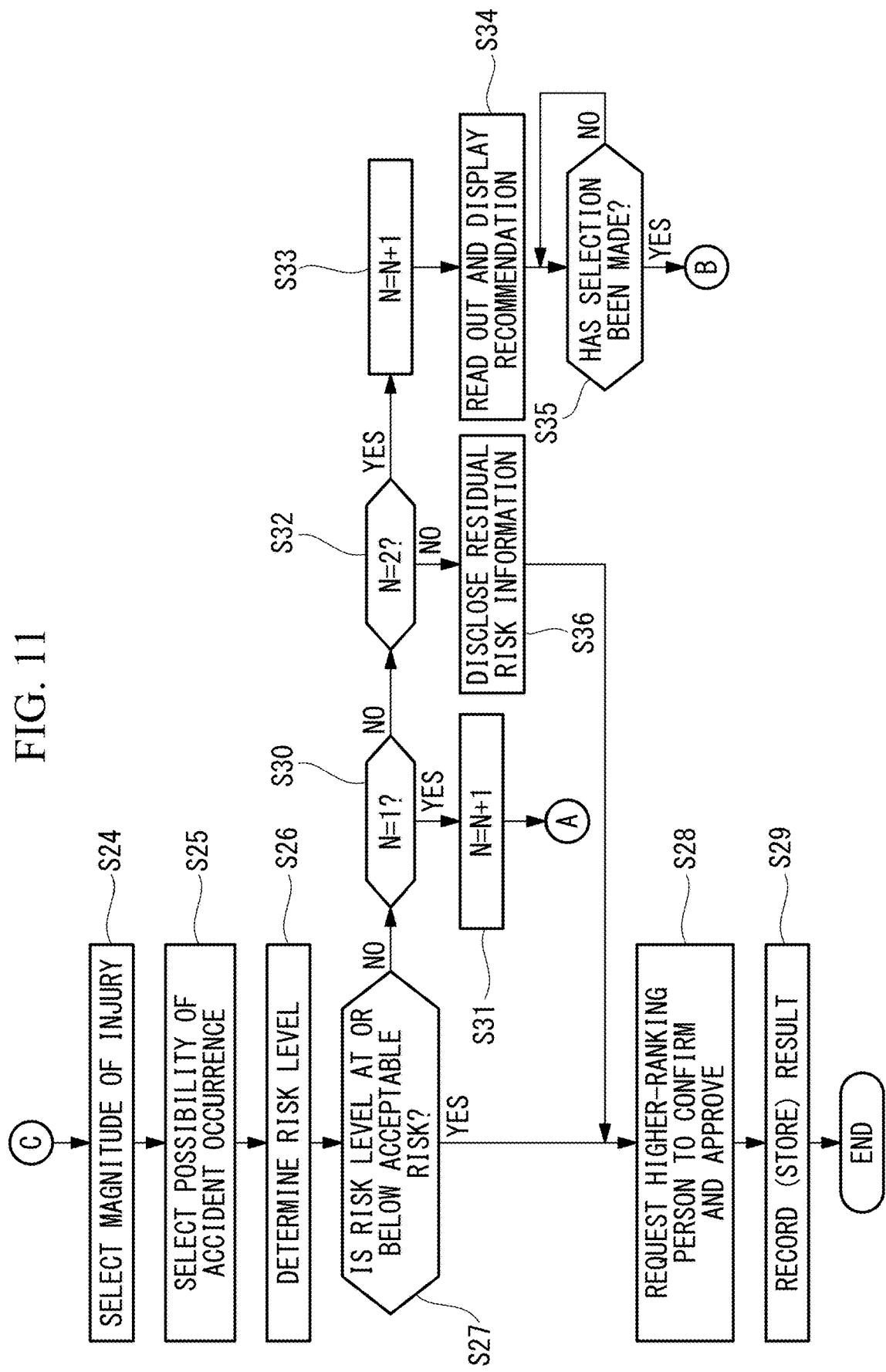
FIG. 11 is a flowchart showing the continuation from FIG. 10.

Furthermore, as shown in FIG. 11, the processing device 5 selects the "magnitude of injury" from the specifics of the selected "harm" (step S24). In addition, the processing device 5 selects the "possibility of accident occurrence" from the selected "situation" and "trigger" and the "frequency" and the "viewpoint about possibility of accident occurrence represented by risk index" that have already been input (step S25). Then, the processing device 5 performs a risk assessment before implementing countermeasures by determining the risk level on the basis of the selected "magnitude of injury" and "possibility of accident occurrence" (step S26).

Next, the processing device 5 determines whether the risk level is at or below the acceptable risk (step S27), and requests confirmation and approval by a higher-ranking person in the case in which the risk level is at or below the acceptable risk (step S28). The processing device 5 records (or prints out) the approved risk assessment result in the storage device 3 (step S29).

On the other hand, in the case in which it is determined in step S27 that the risk level is not at or below the acceptable risk, it is determined whether the counter N is 1 (step S30), and, in the case in which the counter N is 1, the counter N is incremented and the steps from step S10 are repeated (step S31). In other words, the candidates of the "work conditions", the "peripheral environment", and the "conditions for collaborating with people" are displayed on the display device 4, and the user is prompted to reconsider the conditions (steps S10 to S15).

The processing device 5 executes the steps from steps S16 to S26 on the basis of the information reconsidered by the user, and determines the risk level again. In the case in which the determined risk level is not at or below the acceptable risk again, it is determined whether the counter N is 2 (step S32).

In the case in which the counter N is 2, the counter N is incremented (step S33), and recommendation information items are read out from the storage device 3 (step S34). The user selects one of the recommendation information items displayed on the display device 4 by using the input device 2 (step S35).

In the case in which a recommendation information item is selected by the user, among the information items that have been input, the information items of the "peripheral environment" and the "conditions for collaborating with people" are rewritten. Then, the steps from step S16 are repeated on the basis of the rewritten information items, and the risk level is determined again (step S26).

In the case in which the determined risk level is not at or below the acceptable risk again, it is determined whether the counter N is 2 (step S32), Because N is 3, the residual risk information is presented in step S36. Subsequently, confirmation and approval by the higher-ranking person are performed without performing the risk assessment again (step S28).

It is necessary to disclose information about the residual risk still remaining after implementing protective measures, and, furthermore, responses such as executing "describing countermeasures in work procedure", "install sign and warning display", "wearing protective equipment", and "educational training" are requested.

As has been described above, with the collaborative-robot risk assessment guidance device 1 according to this embodiment, the items required in a collaborative-robot risk assessment are read out from the storage device 3 and displayed on the display device 4. Therefore, the user can perform a risk assessment simply by selecting relevant items from the displayed items.

In particular, because the "conditions for collaborating with people" are input as the basic information, there is an advantage in that a user who is inexperienced with the risk assessment can perform a risk assessment in a simple manner. Also, in the case in which it is not possible to achieve a risk level that is at or below the acceptable level by using the input information, the recommendation information for providing a distance between the collaborative robot and the user without dividing a space therebetween is presented. Accordingly, it is possible to allow the user to execute countermeasures for reducing the risk level in a simple manner.

Note that, in this embodiment, prior to executing the risk assessment guidance in FIG. 6, the user may be prompted to input a possessed qualification related to risk assessment. In addition, questions for narrowing down candidate information about the hazard sources may be displayed on the display device 4, and the user may be prompted to answer.

Examples of the possessed qualification to be input include safety lead assessor (SLA), safety assessor (SA), safety sub-assessor (SSA), and safety basic assessor (SBA).

In addition, the questions to be answered in advance are, for example, shown in FIG. 12. Answers to these questions are selected from three options, namely, "YES", "NO", and "DO NOT KNOW".

Also, in a risk assessment guidance for a user who is determined to have a high level of knowledge related to risk assessment on the basis of the input possessed qualification, selections of categories related to questions answered "YES" may be omitted. Examples of the related categories include the hazard source options.

In other words, only the hazard sources related to questions answered "NO" or "DO NOT KNOW" may be displayed and the user may be prompted to make a selection. Accordingly, there is an advantage in that, for a user who has a high level of knowledge about risk assessment, it is possible to reduce the cumbersomeness by reducing the selection items.

In addition, in this embodiment, as shown in FIG. 11, the conditions from step 10 are reconsidered only in the case in which the risk level is not at or below the acceptable level in step S27 in the first risk assessment. Alternatively, reconsideration of the conditions may be repeated until the residual risk falls within an acceptable range.

The invention claimed is:

1. A collaborative-robot risk assessment guidance device, comprising:
    a storage configured to store work type information, peripheral environment information, and conditions for collaborating with people;
    a display; and
    a processor connected to the storage and the display, wherein the processor is configured to:
    receive, from the storage, the work type information, the peripheral environment information, and the conditions for collaborating with people;
    read out a plurality of hazard sources stored in the storage in association with the received work type information, the peripheral environment information, and the conditions for collaborating with people,
    display the plurality of hazard sources on the display,
    prompt a user to select at least one hazard source of the plurality of hazard sources,
    receive the selected at least one hazard source,
    prompt the user to select a harm, a situation, and a trigger associated with the selected at least one hazard source,
    perform a risk assessment based upon a magnitude of injury and a possibility of accident occurrence determined from the harm, the situation, and the trigger,
    determine whether a result of the risk assessment is at or below an acceptable risk, display, on the display, countermeasure proposals in a case in which the result of the risk assessment is not at or below the acceptable risk, and prompt the user to reconsider the work type information, the peripheral environment information, and the conditions for collaborating with people, wherein the risk assessment is repeated until the result of the risk assessment is at or below the acceptable risk.

2. The collaborative-robot risk assessment guidance device according to claim 1, wherein the processor is further configured to:

prompt the user to input a possessed qualification related to risk assessment prior to receiving the work type information, the peripheral environment information, and the conditions for collaborating with people;

receive the possessed qualification;

display, on the display, questions for narrowing down the plurality of hazard sources to prompt the user to input answers to the questions;

receive the answers; and display, on the display, narrowed-down selection of the plurality of hazard sources on a basis of the received possessed qualification and the received answers.

3. A collaborative-robot risk assessment guidance method, comprising:

receiving, via at least one processor, work type information, peripheral environment information, and conditions for collaborating with people;

reading out, via the at least one processor, a plurality of hazard sources stored in a storage in association with the received work type information, peripheral environment information, and the conditions for collaborating with people;

displaying the plurality of hazard sources on a display;

prompting a user to select at least one hazard source of the plurality of hazard sources, receiving the selected at least one hazard source and prompting the user to select a harm, a situation, and a trigger associated with the selected at least one hazard source;

performing a risk assessment based upon a magnitude of injury and a possibility of accident occurrence determined from the harm, the situation, and the trigger;

determining whether a result of the risk assessment is at or below an acceptable risk, displaying, on the display, countermeasure proposals in a case in which the result of the risk assessment is not at or below the acceptable risk, and prompting the user to reconsider the work type information, the peripheral environment information, and the conditions for collaborating with people, wherein the risk assessment is repeated until the result of the risk assessment is at or below the acceptable risk.

* * * * *